UNITED STATES PATENT OFFICE.

CHARLES H. NORTH, OF SOMERVILLE, MASSACHUSETTS.

IMPROVEMENT IN FERTILIZERS.

Specification forming part of Letters Patent No. 165,172, dated July 6, 1875; application filed April 24, 1875.

*To all whom it may concern:*

Be it known that I, CHARLES H. NORTH, of Somerville, in the county of Middlesex and State of Massachusetts, have invented a new Composition of Matter and Process for Manufacturing it, of which the following is a specification:

In rendering animal substances large quantities of liquor are produced; and my invention consists in a new and improved method of treating this liquor, commonly called "soup" or "soup-liquor," and in the new product obtained from it.

This liquor is a solution in water of fibrine, albumen, chondrine, and gelatine, mixed with phosphates of the alkalies and alkaline earths. When deprived by evaporation of the greater part of its water the liquor becomes viscid, and consequently is difficult to handle, and it retains this viscidity after a long exposure to a heat of 212° Fahrenheit to an extent which practically unfits it for use.

It has been sought, both in this country and in England, to obviate this difficulty by mixing with this viscid matter pulverulent or porous materials, such as phosphate of lime, charcoal, peat, gypsum, and coal-ashes; but none of the materials used correct the viscidity or prevent the deliquescence of the matter obtained by heating this soup-liquor, as hereinbefore practiced; and it is only when used in very large proportions that they even conceal the stickiness of the product with which they are mixed; moreover, (with the exception of the phosphate of lime,) they add little or nothing to the value of the compound.

It has also been attempted to obviate this difficulty by heating this viscid and deliquescent product to such a degree as to convert it into charcoal. This method not only took away all viscidity, and produced a mass which was easily powdered, but it also so entirely corrected the deliquescence that the powdered charcoal was no longer even softened appreciably by a moist atmosphere, and consequently became difficult of solution for the use of plants. In addition, a considerable portion of the ammonia was lost in the process. This process, therefore, although it did correct the viscidity and undue deliquescence of the product treated, introduced new difficulties.

I have discovered that there is a point between the state in which it is left after drying at 212° and the condition in which it exists as charcoal when it is not at all viscid, and does not sensibly soften under ordinary circumstances, and yet it possesses, in a sufficient degree, the property of dissolving readily in the water of the soil. These valuable characteristics—brittleness and solubility without deliquescence—are what distinguish my product from anything heretofore produced from these soup-liquors, and can be given to the product by subjecting the liquor, after it has been evaporated until it contains only about twenty-five per cent. of water, to a high degree of heat, but less than sufficient to char it, until the expulsion of the moisture is seen to be ended.

I prefer to practice my process by first evaporating the liquor until it contains only about twenty-five per cent. of moisture, and afterward pouring this thick liquid into a shallow jacketed pan of boiler-iron to the depth of from one and a half to three inches, heating the pan before pouring in the liquid by charging the jacket with steam of about sixty pounds pressure, preferring rather more than less pressure, as the object is to raise the temperature of the liquid to about 300°; but care should be taken not to raise it much beyond 350°, as otherwise it will char. The jacket is kept charged with steam until the expulsion of moisture is seen to be ended, which will commonly be about four hours if the steam be about eighty pounds pressure, and the liquid about two inches in depth. The steam is then shut off, and the pan and its contents allowed to cool, or cooled by filling the jacket with water. The cooled mass in the pan is then removed by means of a chisel, bar, or similar implement. When quite cold the mass is easily powdered, a disintegrating-mill being convenient for the purpose, and it is, of course, more easily powdered in clear, dry weather than in humid weather. In practice I mix this powder with dried blood and flesh. This flesh is mainly scraps from the rendering-tanks, now commonly produced where rendering is done—in the proportion of two parts of the blood and flesh to one of the powder, by weight—and pack the mixture in airtight casks. In this situation it remains pulverulent and easy of application to the soil, or of admixture with common superphosphate of lime.

In the process of baking there is a trifling loss of ammonia, but not enough to make it objectionable, in view of the great advantage of the process. With this trifling exception all the valuable elements of the soup-liquor remain in the product, which is left pure, without adulteration of any kind, and in the most concentrated form for transportation or use. The powder thus produced is not at all viscid, but is somewhat deliquescent, as is necessary for its proper action as a fertilizer. It is for that reason (and also because the dried blood and dried flesh or scraps above mentioned are products of my main business) that I prefer to mix this powder with this dried matter. My new product is, of course, much less deliquescent before it is powdered than afterward, but in all cases it is preferable to mix it with some other pulverulent fertilizer.

I do not, of course, claim the process of evaporating soup-liquor, as I have stated above that that process is old; nor do I claim the substance produced by the mere evaporation of soup-liquor. The gist of my invention lies in the application of a high degree of heat at the conclusion of the process of evaporation, the degree of heat being limited, so as to prevent all danger of charring. This degree of heat produces a product which, although it contains only such solid ingredients as would be contained in the product of the mere evaporation of the soup-liquor, is yet widely different from that product, that being extremely viscid and highly deliquescent, while my product is not at all viscid, but brittle and only slightly deliquescent.

What I claim as my invention is—

1. As an improvement in the art of manufacturing fertilizers, the process of treating the soup obtained upon rendering offal, consisting in heating it, when the water is nearly all evaporated, to about 300° Fahrenheit for about four hours, substantially as described.

2. The fertilizer produced by heating the soup obtained upon rendering offal to about 300° Fahrenheit after the water is mostly evaporated from it, as above described.

CHAS. H. NORTH.

Witnesses:
J. E. KNOX,
J. E. MAYNADIER.